United States Patent [19]

Dinsmore

[11] Patent Number: 5,157,841

[45] Date of Patent: Oct. 27, 1992

[54] PORTABLE ELECTRONIC COMPASS

[76] Inventor: Robert C. Dinsmore, G-3100 Miller, Apt. 13B, Flint, Mich. 48507

[21] Appl. No.: 649,547

[22] Filed: Feb. 1, 1991

[51] Int. Cl.⁵ .................. G01R 33/04; G01C 17/28
[52] U.S. Cl. .................................. 33/361; 33/355 R
[58] Field of Search ............ 33/361, 356, 362, 355 R, 33/357, 363 R

[56] References Cited

U.S. PATENT DOCUMENTS

| | | | |
|---|---|---|---|
| 3,921,305 | 11/1975 | King, Jr. et al. | 33/363 R |
| 3,971,981 | 7/1976 | Nakagome et al. | 33/361 |
| 4,402,142 | 9/1983 | Dinsmore | 33/357 |
| 4,459,749 | 7/1984 | Rieder et al. | 33/784 |
| 4,672,565 | 6/1987 | Kuno et al. | 33/357 |
| 4,677,754 | 7/1987 | Hormel | 33/356 |
| 4,791,729 | 12/1988 | Suda | 33/361 |
| 4,859,944 | 8/1989 | Webb | 33/361 |

Primary Examiner—William A. Cuchlinski, Jr.
Assistant Examiner—C. W. Fulton
Attorney, Agent, or Firm—Krass & Young

[57] ABSTRACT

The invention is a motion sensitive, battery operated compass utilizing Hall effect digital switches to sense the orientation of the compass in relation to the earth's magnetic field. A vibration sensing circuit serves to turn the compass on when it is in motion, and to turn the compass off when it is at rest. A chopper circuit is provided to interrupt the power supply at a predetermined frequency to conserve battery power. The Hall effect switches are mounted in a known relationship to a rotating magnet allowing selection and decoding of the sensor outputs to provide signals for the operation of an alpha numberic display.

4 Claims, 2 Drawing Sheets

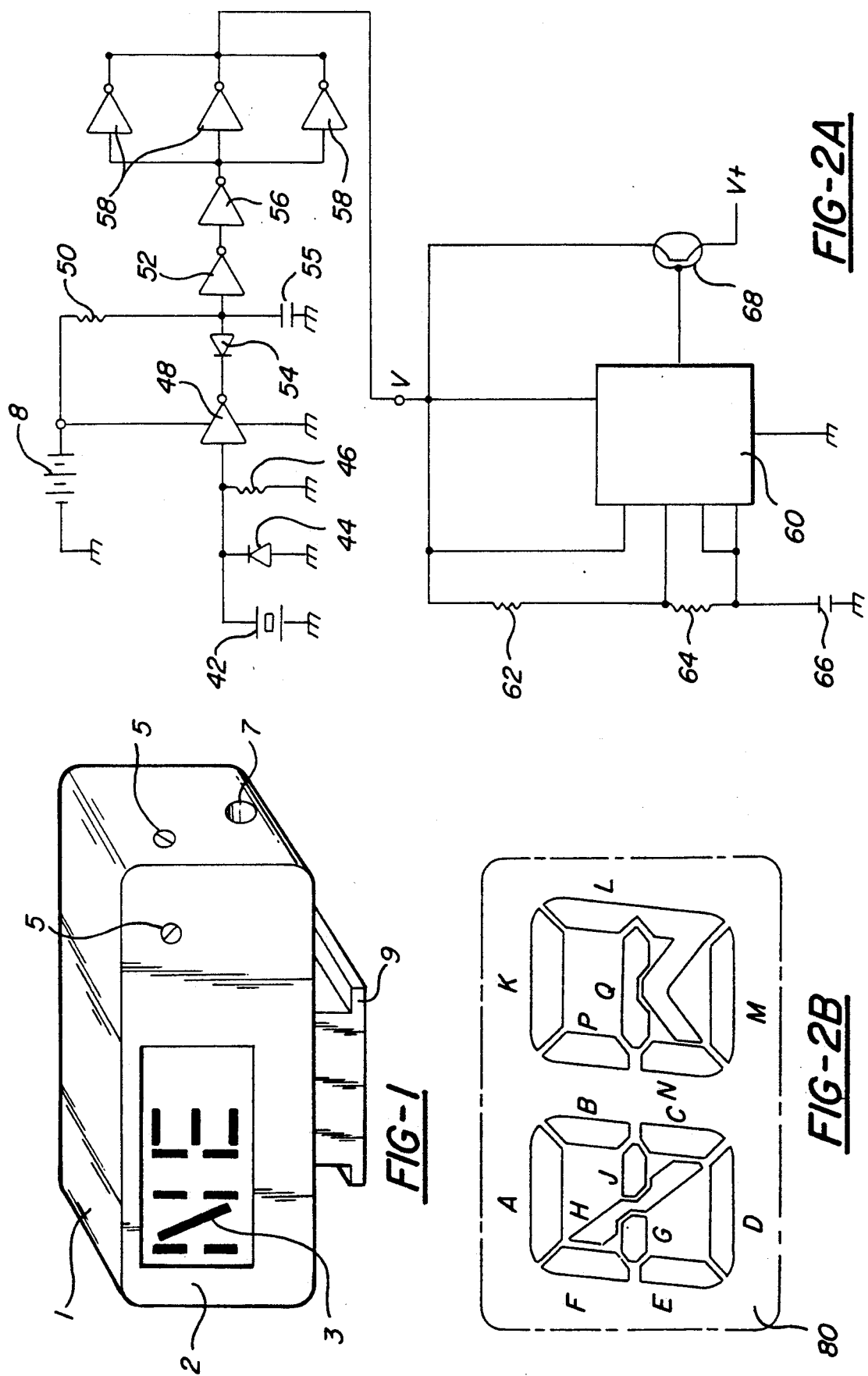

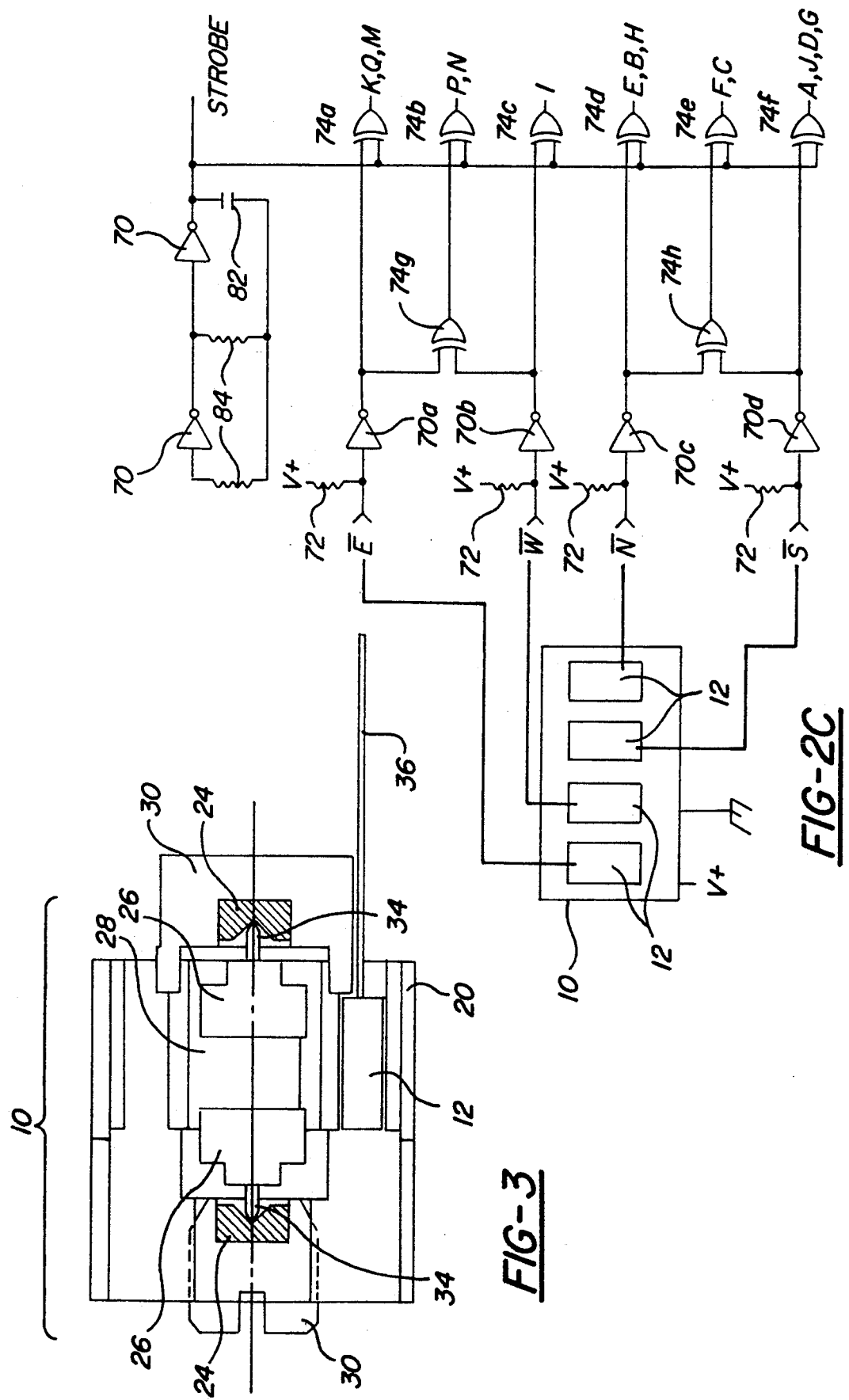

PORTABLE ELECTRONIC COMPASS

FIELD OF THE INVENTION

The present invention relates to electromagnetic compasses, and more particularly to battery operated compasses specifically adapted for portable use.

BACKGROUND OF THE INVENTION

Electronic compasses are not new in the art. Both flux gate and Hall effect circuitry have been used to create suitable directional displays for a variety of navigational tasks.

For example, U.S. Pat. No. 4,402,142, issued to Robert C. Dinsmore on Sep. 6, 1983, describes an electronic compass for automobiles utilizing a series of Hall effect sensors. However, the circuits used in that invention have proven to require significant amounts of current, rendering the devices relatively impractical for portable use. Because of the current demands of the Hall effect sensors, amplifiers, Schmitt triggers and display drivers, present Hall effect devices typically consume current at the rate of approximately 200 milliamperes per hour. Extremely large batteries would be necessary to power these devices for extensive periods of time.

The within invention eliminates substantial current consuming portions of the typical Hall effect or flux gate-type compass, adds a "chopper" circuit which effectively shuts the compass electronics off during most of its operating cycle, and a vibration sensing device which shuts off electrical power to the compass when it is motionless for a specified time.

SUMMARY OF THE INVENTION

The invention comprises a miniaturized Hall effect sensor assembly, containing Hall effect devices which respond to the changes in magnetic field resulting from the rotation of a pivotally mounted annular magnet located in proximity to the sensors. The outputs from the Hall effect sensors are used to drive a low power decoder-driver circuit. The outputs of the decoder driver circuit, in turn, are used to operate a visible display, capable of indicating, in abbreviated form, the eight major points of the compass. An intermittent power supply is used to cycle the circuitry on and off at a rapid rate, thereby drastically reducing the power consumption. In a second embodiment, the operation of the compass is further controlled by a vibration sensitive switch which turns off power to the circuit when the compass assembly is at rest for a pre-defined period of time.

The invention, together with additional objects, features and advantages thereof, will be best understood from the following descriptions, the appended claims and the accompanying drawings, in which:

BRIEF DESCRIPTION OF THE DRAWINGS

FIG. 1 is a perspective view of one presently preferred embodiment of the compass;

FIG. 2A is an electrical schematic diagram of a portion of the compass circuitry;

FIG. 2B is a diagram o the compass display;

FIG. 2C is an electrical schematic diagram of a portion of the compass circuitry; and FIG. 3 is a cross-sectional view of the Hall effect sensor assembly.

Referring to FIG. 1, a portable compass 1 in one presently preferred embodiment is depicted, showing the case 2, display 3, and compensator adjusting screws 5. The compass case contains an internal battery compartment, as well as an electrical jack 7 suitable for supplying external power through an appropriate plug removably placed into said jack. A pedastal 9 is provided for mounting of the case in a readily viewable location Referring to FIG. 2A-C, a full understanding of the operation of the compass may be obtained through an understanding of the operation of the major components of the circuit: the Hall effect sensors, the power supply, the decoder driver, the oscillator, the display, the chopper circuit and the motion sensor.

Referring first to the Hall effect sensor assembly 10, as shown in cross-section in FIG. 3, said sensor assembly contains four Hall effect devices 12. These Hall effect devices are commercially available, for example, as Sprague part number UGN-3013T, and comprise an integrated circuit including a voltage regulator, a Hall voltage generator, a signal amplifier, a Schmitt trigger, and an open collector output transistor on a single silicon chip. The emitter is connected to ground, and the base connected to the designated positive voltage source. The outputs from the collector of the transistors are used to drive, the appropriate portions of the decoder driver circuit.

The Hall effect devices 12 are mounted radially, at 90 degree intervals in a housing 20, surrounding a magnetic rotor assembly. The magnetic rotor assembly pivots freely in jeweled bearings 24. The rotor assembly consists of the rotor caps 26, and a cylindrical magnet 28 secured to said rotor caps. Jeweled end cap 30 provides one pivot point for said rotor, and an adjustable jeweled screw 32 forms the opposite end pivot point. By adjustment of the jeweled screw, the friction exerted by the jewels on the rotor pins 34 may be adjusted to regulate the rate at which the rotor is permitted to turn. Leads 36 from the Hall effect devices protrude through the housing 20 to allow electrical connections to be made, and the entire housing is sealed to keep out dust and other contaminates and insure desired movement of the rotor assembly. In operation, the magnet 28 of the rotor assembly tends to stay stationary under the influence of the earth's magnetic field, and as the housing 20 rotates around the rotor, a varying magnetic field is presented to each of the Hall effect devices 12 located within the housing. When a predetermined magnetic field level is applied to any of the Hall effect devices 12, the sensor 10 responds by conducting, thereby forming a closed circuit between the open collector output of the transistor and ground. This signal is then presented to the printed circuit board assembly as herein described.

The circuit board assembly contains the power supply, the oscillator, the decoder driver circuit, the display, the chopper circuit and the motion-sensing switch. The detailed operation of the circuit is better understood with simultaneous reference to the following description and the schematics as shown in FIG. 2A-C.

Power is supplied to the circuit through either internal or external battery, or a vehicle electrical power supply, supplying nominally of nine to twelve volts DC input power 8. This voltage may be regulated and filtered by a simple regulator circuit to obtain a relatively well filtered nine volt DC power source.

Thereafter, the power supply output is electrically connected to a motion sensing switch circuit. A motion sensing device acts as an open circuit when it has been physically inactive for a period of approximately 1 second or more. Any motion, however slight, results in closure of the switch circuit, thereby allowing current to pass for further operation of the compass. With further reference then to FIG. 2A, a detailed schematic for the vibration sensor is displayed. A piezo-electric motion sensor 42, of a type commercially available, generates a small AC current when subjected to movement. The negative component of the AC current flows to ground through the motion sensing circuit diode 44. Associated resistor 46 holds one input of one section 48 of a hex inverting buffer IC low. The positive component of the AC signal from the piezo-electric sensor 42, when presented to the first section of the hex inverting buffer is converted to a negative going pulse from the output of the first stage of the buffer. Resistor 50 serves to hold this output normally high. Power is supplied to the power input of the hex inverting buffer, and the buffer is likewise grounded in the usual fashion. Buffer output diode 54 serves to prevent current flow back into the first stage buffer output. The negative going output pulse from the first stage of the hex inverter is presented to the second stage of the hex inverting buffer 52, which acts as a filter, and again to the third stage 56 which again inverts the signal. Capacitor 55 acts to further filter the input to second stage 52. The negative going output of the third stage is presented simultaneously to the fourth, fifth and sixth stages 58 of the hex inverter, which serve as a current amplifying device. The resulting positive going output drives the chopper circuit.

The electronic components which make up the compass circuit may be operated intermittently, if the cycle rate is fast enough, without notable degradation of performance of the visible display to the naked eye. In this fashion, the circuit can be turned on and off rapidly, at a rate of approximately 280 cycles per second. The chopper circuit is designed to supply power to the compass circuitry approximately one percent of the time, with a ninetynine percent "off" cycle. Referring again to FIG. 2A, the chopper circuit operates as follows:

A commercially available low powered consumption integrated circuit in the form of a programmable timer 60 such as the KS 555 is powered by the output from the motion sensor circuitry. Reference resistors 62 and 64 operating in conjunction with timing capacitor 66. In a preferred embodiment, resistor 62 is a one hundred fifty thousand ohm resistor. Resistor 64 is a one thousand ohm resistor and timing capacitor 66 is a 0.01 microfarad non-polarized capacitor. The desired output from the integrated circuit 60 is in the form of a square wave, having a frequency of approximately 950 hertz. This output drives the base of npn transistor 68 at a duty cycle of approximately 0.68 percent, representing a transistor "on" time of 6.93 micro seconds, and a corresponding "off" time of 1053 micro seconds. The emitter output from transistor 68 is used to drive the remaining compass circuitry.

To the circuit, however, this intermittent current functions essentially in the same fashion as a continuous DC power source.

Referring to FIG. 2C, output from the Hall effect devices 12 are fed to inputs of inverters 70a, 70b, 70c, 70d, which are preferably part of a 4049 hex inverter using CMOS circuitry. This single integrated circuit contains six discrete inverters 70a, 70b, 70c, 70d, 70 which amplify filter and invert outputs of the Hall effect sensor assembly. The inputs for each inverter are held high by pull-up resistors 72. When the collector of the output transistors for the Hall effect sensors go to ground state, the inverter input is likewise pulled to a zero voltage state, resulting in a positive going or "true" output from the inverter. In this fashion, the outputs of the Hall effect sensors are presented as true logical signals to the decoder circuitry. The decoder consists of two quad exclusive "or" gate integrated circuits, arranged to directly drive the luminous segments of a light-emitting diode array. Each circuit contains 4 exclusive "or" gates 74a, 74b, 74c, 74d, 74e, 74f, 74g, 74h.

The display light emitting diode array 80 is a multiplexed array. The negative or ground signal to the display is derived from an oscillator formed from the two inverter sections 70 of the hex inverter not dedicated to decoding and driving, and through the use of a conventional RC circuit. The pulse or "strobe" input to the display is derived from this oscillator, which oscillates at a frequency which is a function of the capacitor 82 in the RC circuit In the preferred embodiment, a 0.1 microfarad electrolytic capacitor results in a strobe output of approximately sixty hertz, suitable for almost all purposes. Resistors 84 are selected to appropriately bias the oscillator.

The display may be in the form of light emitting diode array 80, or a liquid crystal or plasma display. Two characters are provided, each comprised of a different number of display segments identified as A through Q. The left-most character is a nine segment display, and the right-most character is a six segment display. The operation of the Hall effect sensor assembly, and the output signals from each of the Hall effect devices as above described is presented as an output from one or more of the six exclusive or gates 74a, 74b, 74c, 74d, 74e, 74f which constitute the final output from the decoder circuitry. With reference also to FIG. 2B, each such output corresponds to the input or individual segments of the display 80. In operation, both east-west common exclusive or gate 74g is active or "high", whenever an input signal is present on either the east or west inverters 70a or 70b. The east-west common inverter 74a serves to drive segments p and n of the right-most display character. When only inverter 70a is pulled low at its input, the output of exclusive or gate 74a is driven high, thereby illuminating segments k, q and m of the right-most display. The resulting character generated by the right-most display is the letter "E", representing east. In like fashion, when only inverter 70b is pulled low by the appropriate Hall effect device, exclusive or gate 74c is driven high, thereby illuminating segment 1 of the right-most display, which in addition to segments p and n, illuminated by the east-west common output of exclusive or gate 74b, results in the display of the letter "W" representing west. In like fashion, exclusive or gate 74d, 74e, and 74f, work in conjunction with inverters 70c and 70d to produce the characters "N" and "S" in the left-most display.

Both displays are designed to depict the cardinal compass point as follows: The left-most display is used to delineate the letter "N" for north, and the letter "S" for south. The rightmost display is configured to display the letter "E" for east and "W" for west.

The Hall effect sensors are positioned so that when two or more of the sensors are activated, the compass may display intermediate points such as "NW", "SE" and the like.

In this fashion, the movement of the compass in relation to the earth's magnetic field results in the illumination of the display segments in a fashion corresponding to the direction in which the compass has been oriented.

To adjust the compass display and compensate for variations in the first magnetic field, as well as for deviations induced by the proximity of the compass to materials having magnetic properties, a pair of mechanical compensation devices are mounted, within the case, and in close proximity to the magnetic sensor assembly. Each such compensation assembly is in the form of a plastic screw 5 mounted in fixed relation to the case 2. Threadably attached to each said screw 5 is a ferrous nut, mounted in such fashion as to permit the nut to move laterally, along the longitudinal axis of the screw 5, but restricted from rotation. Turning the compensation adjusting screw, therefore, results in movement of the ferrous nut from one end of the adjusting screw to the other, within defined physical limits within the case 2. The attraction between the magnetic rotor and the ferrous nut is such as to influence the rotational position of the magnetic rotor assembly slightly, thereby allowing adjustment of the static orientation of the magnetic rotor in relation to the compass case.

I claim:

1. A compass comprising:
    a. a plurality of Hall effect sensors;
    b. a magnet pivotably mounted in fixed proximity to said sensors;
    c. a signal generating circuit means for detecting the electrical current flowing through said sensors;
    d. display means for, converting said generated signals into a visible display corresponding to the orientation of said magnet in relation to said sensor;
    e. a motion-sensing switch for activating said circuit means only when said compass is in motion;
    f. an oscillating power supply for supplying cyclical power impulses to said circuit means, said Hall effect sensors and said display means.

2. The invention according to claim 1, wherein said motion sensing switch further comprises:
    a. a piezo-electric motion sensing device;
    b. means for detecting the output of said piezoelectric motion sensing device;
    c. means for amplifying the output of said piezoelectric motion sensing device; and
    d. means for connecting said amplified output of said piezo-electric motion sensing device to said signal generating circuit means.

3. The invention of claim 1, wherein said oscillating power supply further comprises:
    a. a programmable a stable multi-vibrator, and
    b. output transistor means for amplifying the output of said a stable multi-vibrator.

4. The invention of claim 3, wherein said output comprises an on-cycle to off-cycle ratio of approximately one percent.

* * * * *

UNITED STATES PATENT AND TRADEMARK OFFICE
CERTIFICATE OF CORRECTION

PATENT NO. : 5,157,841
DATED : October 27, 1992
INVENTOR(S) : Dinsmore It is certified that error appears in the above-identified patent and that said Letters Patent is hereby corrected as shown below:

In the Abstract, "numberic" should be --numeric--;

Column 1, line 64, "o the" should be --of the--;

Column 3, line 42, "ninetynine" should be --ninety-nine--;

Column 3, line 68, "70" should be deleted;

Column 4, line 13, "74g, 74h" should be deleted;

Column 4, line 22, "circuit In" should be --circuit. In--;

Column 6, line 3, "for, converting" should be --for converting--;

Column 6, line 23, "a stable" should be --astable--;

Column 6, line 25, "a stable" should be --astable--.

Signed and Sealed this

Twelfth Day of October, 1993

Attest:

Attesting Officer

BRUCE LEHMAN
Commissioner of Patents and Trademarks